US012480997B2

(12) United States Patent
Dixon et al.

(10) Patent No.: US 12,480,997 B2
(45) Date of Patent: Nov. 25, 2025

(54) INTEGRATED STACKABLE BATTERY EMULATOR FOR BATTERY PACK SIMULATION

(71) Applicant: Vertiv Corporation, Westerville, OH (US)

(72) Inventors: William M. Dixon, Lewis Center, OH (US); Benjamin D. Shaffer, Lewis Center, OH (US)

(73) Assignee: Vertiv Corporation, Westerville, OH (US)

( * ) Notice: Subject to any disclaimer, the term of this patent is extended or adjusted under 35 U.S.C. 154(b) by 166 days.

(21) Appl. No.: 18/242,744

(22) Filed: Sep. 6, 2023

(65) Prior Publication Data

US 2024/0103083 A1    Mar. 28, 2024

Related U.S. Application Data

(60) Provisional application No. 63/410,088, filed on Sep. 26, 2022.

(51) Int. Cl.
  *G01R 31/367*    (2019.01)
  *G01R 31/3835*   (2019.01)
  *G01R 31/385*    (2019.01)

(52) U.S. Cl.
  CPC ....... *G01R 31/367* (2019.01); *G01R 31/3835* (2019.01); *G01R 31/385* (2019.01)

(58) Field of Classification Search
  CPC ............... G01R 31/367; G01R 31/385; G01R 31/3835

(Continued)

(56) References Cited

U.S. PATENT DOCUMENTS 9,728,359 B1 * 8/2017 Katrak ............ G01R 19/16566
11,735,933 B2 * 8/2023 Nandi ................... H02J 7/0034
                                                         361/84

(Continued)

OTHER PUBLICATIONS

Alexandre Collet et al: "Multi-cell battery emulator for advanced battery management system benchmarking", Industrial Electronics (ISIE), 2011 IEEE International Symposium on, IEEE, Jun. 27, 2011, pp. 1093-1099.

(Continued)

*Primary Examiner* — Huy Q Phan
*Assistant Examiner* — Trung Q Nguyen
(74) *Attorney, Agent, or Firm* — Suiter Swantz IP

(57) ABSTRACT

The present disclosure is a battery emulator that permits the development and testing of battery software, firmware, and/or circuitry with lowered risk of shock, explosion, fire, or other dangerous conditions. The battery emulator may include a single input voltage source that provides an input voltage to an adjustable voltage regulator. The battery emulator further includes a user control device coupled to the adjustable voltage regulator and configured to control an output of the adjustable voltage regulator, wherein the output of an adjustable voltage regulator is configured to replicate an output voltage of a single battery cell of a multi-cell battery. The battery emulator further includes voltage isolation circuitry which isolates the input voltage and/or output voltage from an adjustable voltage regulator, preventing them from interfering with the user control device.

20 Claims, 3 Drawing Sheets

(58) Field of Classification Search
USPC ............... 324/600, 500, 76.11, 425–434
See application file for complete search history.

(56) References Cited

U.S. PATENT DOCUMENTS

| | | | |
|---|---|---|---|
| 2012/0119765 A1 | 5/2012 | Bracker et al. | |
| 2012/0306266 A1* | 12/2012 | Ohnuki | B60L 8/003 |
| | | | 307/9.1 |
| 2015/0137840 A1* | 5/2015 | Whittington | G05F 1/46 |
| | | | 324/750.01 |
| 2019/0199217 A1* | 6/2019 | G | H02M 1/14 |
| 2021/0278474 A1* | 9/2021 | Ravinuthula | G01R 31/3648 |
| 2023/0122287 A1* | 4/2023 | Eker | H03F 3/45475 |
| | | | 330/308 |

OTHER PUBLICATIONS

Buccolini Luca et al: "Cell Battery Emulator for Hardware-in-the-Loop BMS Test", 2018 IEEE International Conference on Environment and Electrical Engineering and 2018 IEEE Industrial and Commercial Pwoer Systems Europe (EEEIC/I&CPS Europe), Jun. 12, 2018, pp. 1-5.

European Search Report dated Feb. 26, 2024; European Application No. 23196618.5.

Hogerl Tobias et al: "Battery Emulation for Battery Modular Multilevel Management (BM3) Converters and Reconfigurable Batteries with Series, Parallel and Bypass Function", 2021 IEEE International Conference on Environment and Electrical Engineering and 2021 IEEE Industrial and Commercial Power Systems Europe (EEEIC/I&CPS Europe), Sep. 7, 2021, pp. 1-8.

Messier Pascal et al: "Multi-Cell Emulation for Battery Management System Validation", 2018 IEEE Vehicle Power and Propulsion Conference (VPPC), IEEE, Aug. 27, 2018, pp. 1-6.

* cited by examiner

INTEGRATED STACKABLE BATTERY EMULATOR FOR BATTERY PACK SIMULATION

CROSS-REFERENCE TO RELATED APPLICATIONS

The present application claims the benefit under 35 U.S.C. § 119 of U.S. Provisional Patent Application No. 63/410,088 filed Sep. 26, 2022, which is hereby incorporated by reference in its entirety.

TECHNICAL FIELD

The present disclosure generally relates to the field of circuit design emulators, and more particularly, to a battery emulator.

BACKGROUND

Battery packs, such as rechargeable lithium-ion battery packs, are used in an ever-increasing array of electrically-powered products. Beyond the battery substrate itself, battery packs rely on a host of software, firmware, and electronic circuitry to monitor and/or control operation of the battery pack. Due to the electrical nature of the battery pack, care is required when designing and applying changes to the software, firmware, and/or electrical circuits for the battery pack.

Conventional development and testing of battery packs require the use of a real, or actual battery pack which carries higher risk of fire due to accidental abuse of the battery pack. Additionally, conventional development and testing of battery packs require a purchase of a set of isolated, adjustable laboratory supplies, or a multiple-output power supply that allows user adjustment necessary to perform proper testing of a battery pack. Consequently, conventional development and testing of a battery pack requires more time, more expense, and higher risk of electrical shock to the user and higher risk of fire/explosions when the battery pack fails or is otherwise compromised.

Accordingly, there is a need for a battery emulator that permits the development and testing of battery software, firmware, and/or circuitry with lowered cost and lowered risk of shock, explosion, fire, or other dangerous conditions.

SUMMARY

Accordingly, the present disclosure is directed to a battery emulator that permits the development and testing of battery software, firmware, and/or circuitry with lowered risk of shock, explosion, fire, or other dangerous conditions. The battery emulator may include a single input voltage source that provides an input voltage to an adjustable voltage regulator. The battery emulator further includes a user control device coupled to the adjustable voltage regulator and configured to control an output of the adjustable voltage regulator, wherein the output of an adjustable voltage regulator configured to replicate an output voltage of a single battery cell of a multi-cell battery. The battery emulator further includes voltage isolation circuitry which isolates the input voltage and/or output voltage from an adjustable voltage regulator, preventing them from interfering with the user control device. Additionally, the voltage isolation circuitry may allow stacking of a plurality of adjustable voltage regulators coupled to the one, or more user control devices, whereby the single input voltage source may be employed to provide multiple output voltages through virtual grounding and which may replicate the multiple output voltages provided by a multi-cell battery.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Figure 1:
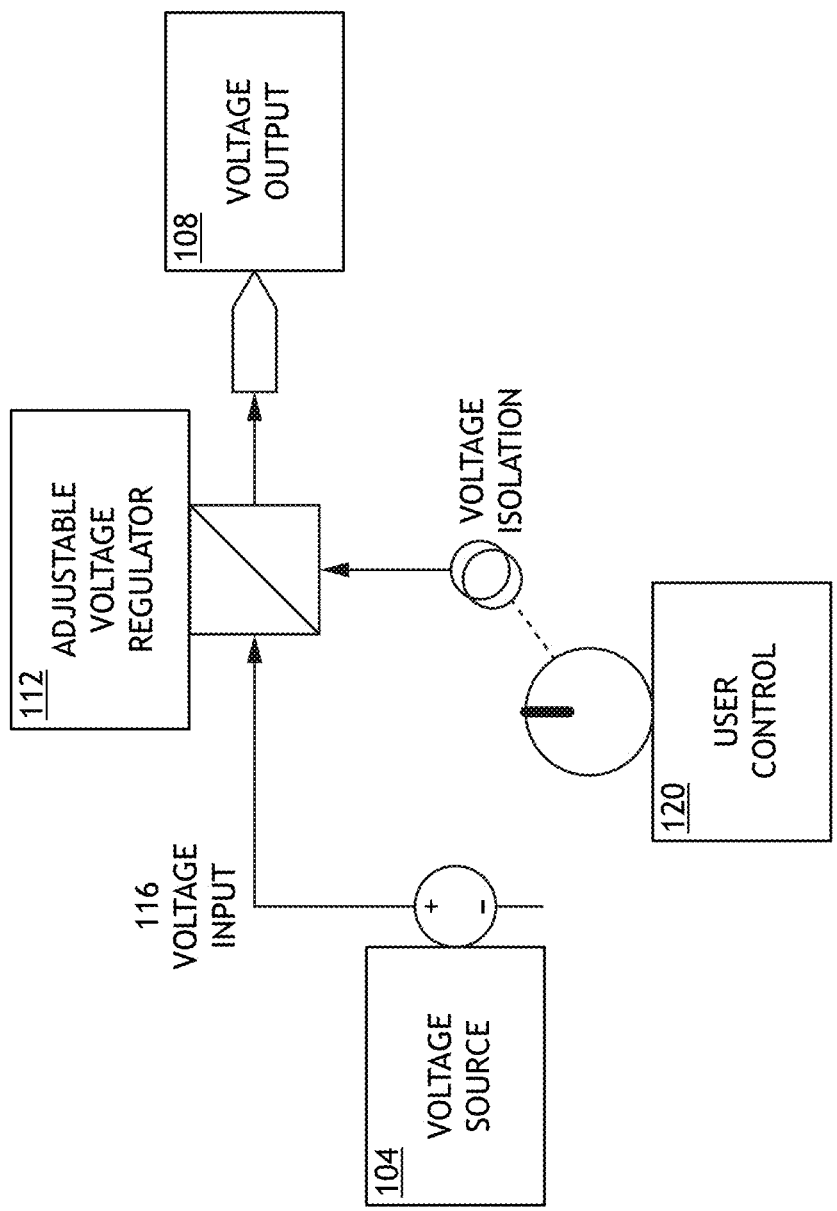
FIG. 1 is a diagram illustrating a battery emulator in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The present disclosure is directed to a battery emulator, the battery emulator delivers power to a device or the electrically relevant components of the device (e.g., such as to a circuit board of a mobile phone, or a circuit board of an uninterruptible power supply (UPS)) delivering a voltage that emulates/imitates or replicates the voltage of a one or more cells of a battery pack. The battery emulator can be adjusted manually or automatically to deliver a range of voltages. The system is modular, capable of forming multiple voltage-generating block configurations that emulate specific battery pack sets formed of a plurality of battery cells. It is further contemplated that voltage monitoring systems may be coupled to the battery pack emulator to test the various conditions and effects on input changes.

Referring to FIG. 1, a diagram illustrating a battery emulator 100, in accordance with one or more embodiments of the disclosure is shown. The battery emulator 100 is configured to deliver a voltage to one or more devices under test and may be representative of a single battery cell. The battery emulator 100 may be configured to emulate any type of battery, battery pack, or other power source. For example, the battery emulator 100 may be configured to emulate any type of rechargeable battery including but not limited to lithium-ion batteries, lead-acid batteries, flow batteries, aluminum-ion batteries, and the like. In another example, the battery emulator 100 may be configured to emulate any type of non-rechargeable battery including but not limited to alkaline batteries (e.g., zinc manganese oxide batteries or carbon batteries, and dry cells). In another example, the battery emulator 100 may be configured to emulate batteries for any application including but not limited to server-backup batteries and automotive batteries. The battery emulator 100 may be configured to emulate any number of cells or batteries within a battery pack, and it should be understood that the term battery may include one or more batteries, and each battery may include one or more cells. For example, the battery emulator 100 may emulate a single battery, a pack containing 10 batteries, each battery of the pack including multiple cells, or a pack containing 100 batteries.

The battery emulator 100 may be configured to deliver any range of voltages. For example, the battery emulator 100 may deliver 0.1 to 1000 volts, 0.3 to 300 volts, 1.0 to 150 volts, or 1.5 volts to 110 volts. In another example, the battery emulator 100 may deliver over 1000 volts. The battery emulator 100 may also be configured to deliver a pulsed DC voltage.

In embodiments, the battery emulator 100 includes an input voltage source 104. The input voltage source 104 may be configured as a fixed voltage source, which is then adjusted by other componentry within the battery emulator 100, such as a potentiometer and the like. The input voltage source 104 may also be configured as an adjustable voltage source. The input voltage source 104 may also be configured as a floating voltage source, with neither terminal of the voltage source 104 operatively coupled to an absolute reference or common ground. The input voltage source 104 may also be configured as having a virtual ground, where a terminal/node of the voltage source 104 is maintained at a steady reference potential without being connected directly to the reference potential.

In embodiments, the battery emulator 100 includes an adjustable voltage regulator 112 configured to receive a voltage input 116 provided from the input voltage source 104 and adjust the voltage to produce the voltage output 108. The adjustable voltage regulator 112 may be of any type including but not limited to a linear regulator or a switching regulator. For example, the adjustable voltage regulator 112 may be configured as a linear regulator having a regulating circuit that varies its resistance and continuously adjusts to maintain a constant output voltage and continually dissipating the difference between the input voltage 116 and regulated voltages as waste heat. The use of a linear regulator may be beneficial as compared to conventional battery emulators as the cost and complexity may be reduced. The adjustable voltage regulator 112 may be configured as a shunt regulator or a series regulator.

In embodiments, the battery emulator 100 includes a user control device 120 operatively coupled to the adjustable voltage regulator 112 and configured to control the output of the adjustable voltage regulator 112. The user control device 120 may be configured as a manual control, operated as a switch or dial, by a user, to allow the user to "dial in" the voltage output 108. The user control device 120 may also be configured as a semi-automated control that is operatively coupled to, or integrated into, a computer or computing device. For example, a user may operate software that sends control signals to the adjustable voltage regulator 112. For example, the user may input a requested voltage output 108 via the software that causes the adjustable voltage regulator 112 to operate according to the input. The user control device 120 may also be configured to operate automatically. For example, for a user control device 120 operatively coupled to, or integrated into, a computer, the software may run a program based on the needs of the user that controls the operation of the adjustable voltage regulator 112 to produce the needed voltage output 108.

In embodiments, the battery emulator 100 may include voltage isolation circuitry operatively coupled to the user control device 120 and the adjustable voltage regulator 112. The voltage isolation circuitry may be configured to isolate the input voltage 116 and/or output voltage 108, preventing them from interfering with the user control device 120. The voltage isolation circuitry may provide galvanic isolation and may prevent current flow between replicated cells of a multi-cell battery emulator. The voltage isolation circuitry may provide that the output voltage is a function of the input voltage and galvanic isolation may exist between the input voltage and the output voltage. The voltage isolation circuitry may include a transformer according to one embodiment of the present disclosure. In an alternative embodiment, the voltage isolation circuitry may include capacitors, opto-isolators, relays, and LED-phototransistor pairs.

Figure 2:
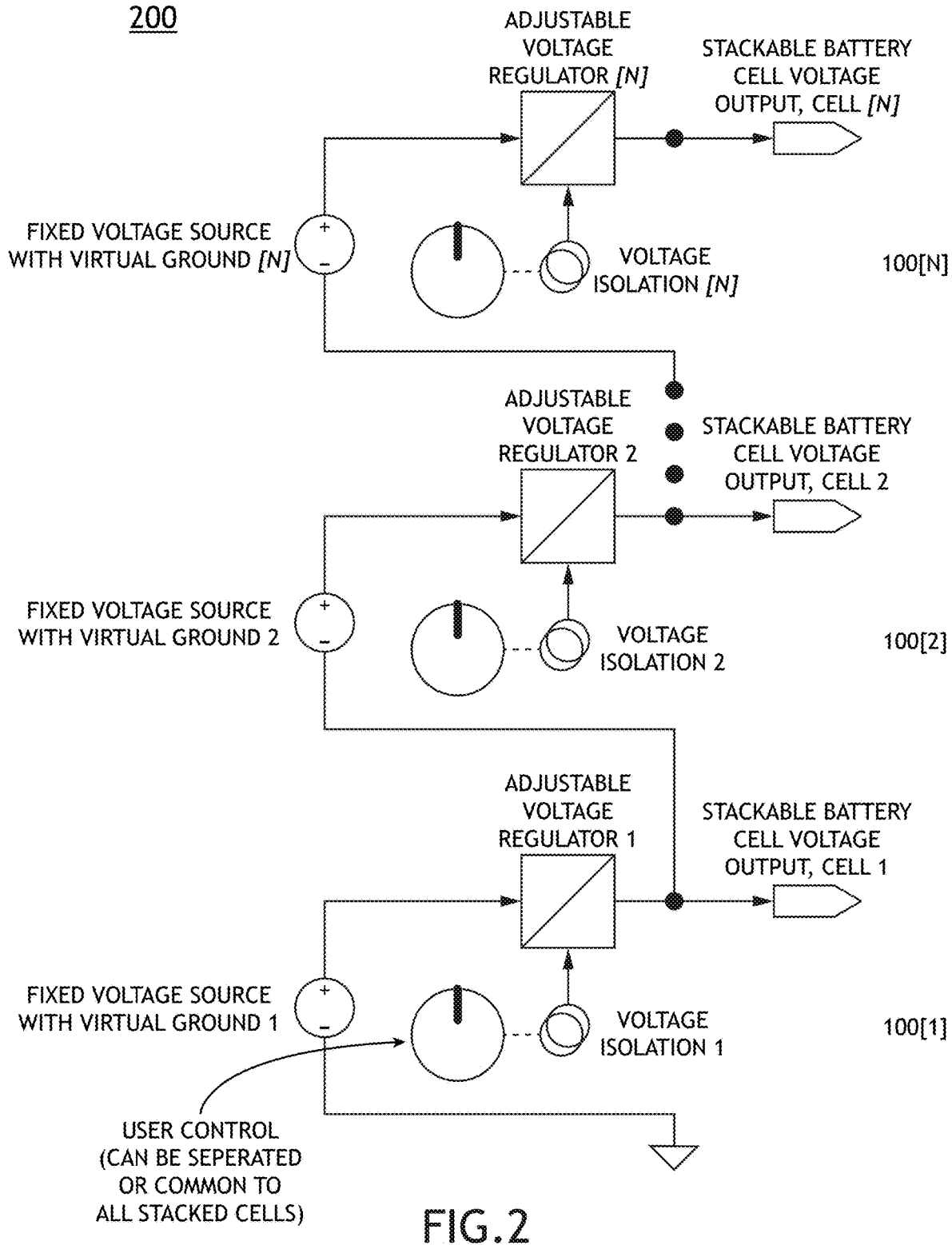
FIG. 2 is a diagram illustrating a system of battery emulators that is configured to emulate multiple battery cell voltages of a battery pack, in accordance with one or more embodiments of the disclosure.

Referring to FIG. 2, a diagram illustrating a system 200 of battery emulators that is configured to emulate multiple battery cell voltages of a battery pack, in accordance with one or more embodiments of the disclosure is shown. The system 200 may include any number of battery emulators 100[1]-100[N] (with N representing a number N of battery emulators and configured to replicate a battery pack with N number of cells), whereby each battery emulator may imitate or replicate a single cell of a battery. For example, the system 200 may include one battery pack emulator, three battery emulators (where N=3), ten battery emulators (where N=10), 100 battery emulators (where N=100), thus emulating a single cell battery pack, a three cell battery pack, a ten cell battery pack, or a 100 cell battery pack.

The modular aspect of the system 200 allows any number of the battery emulators to be stacked in series to emulate the desired battery pack configuration. As shown in FIG. 2, a separate user control device may be employed with each adjustable voltage regulator. Advantageously, system 200 may be implemented with a single input voltage source to provide an input voltage for cell 1 and then effective input voltages may be derived for cells 2 through N as would be present in a multi-cell battery pack while maintaining voltage isolation between the individual battery emulators 100[1]-100[N] and voltage isolation between the output voltages of each adjustable voltage regulator. Additionally, system 200 may provide for independent testing of battery cells (such as may be present in an actual battery pack) as each cell may be coupled to a separate and distinct user control device. In such a fashion, testing of a battery pack may be possible where cell voltages are varied and not consistent across each cell of the battery pack. It is contemplated that system 200 may further include a battery management system which is coupled to the output of the adjustable voltage regulator and the output of the additional adjustable voltage regulator which may be employed for testing and experimentation.

Figure 3:
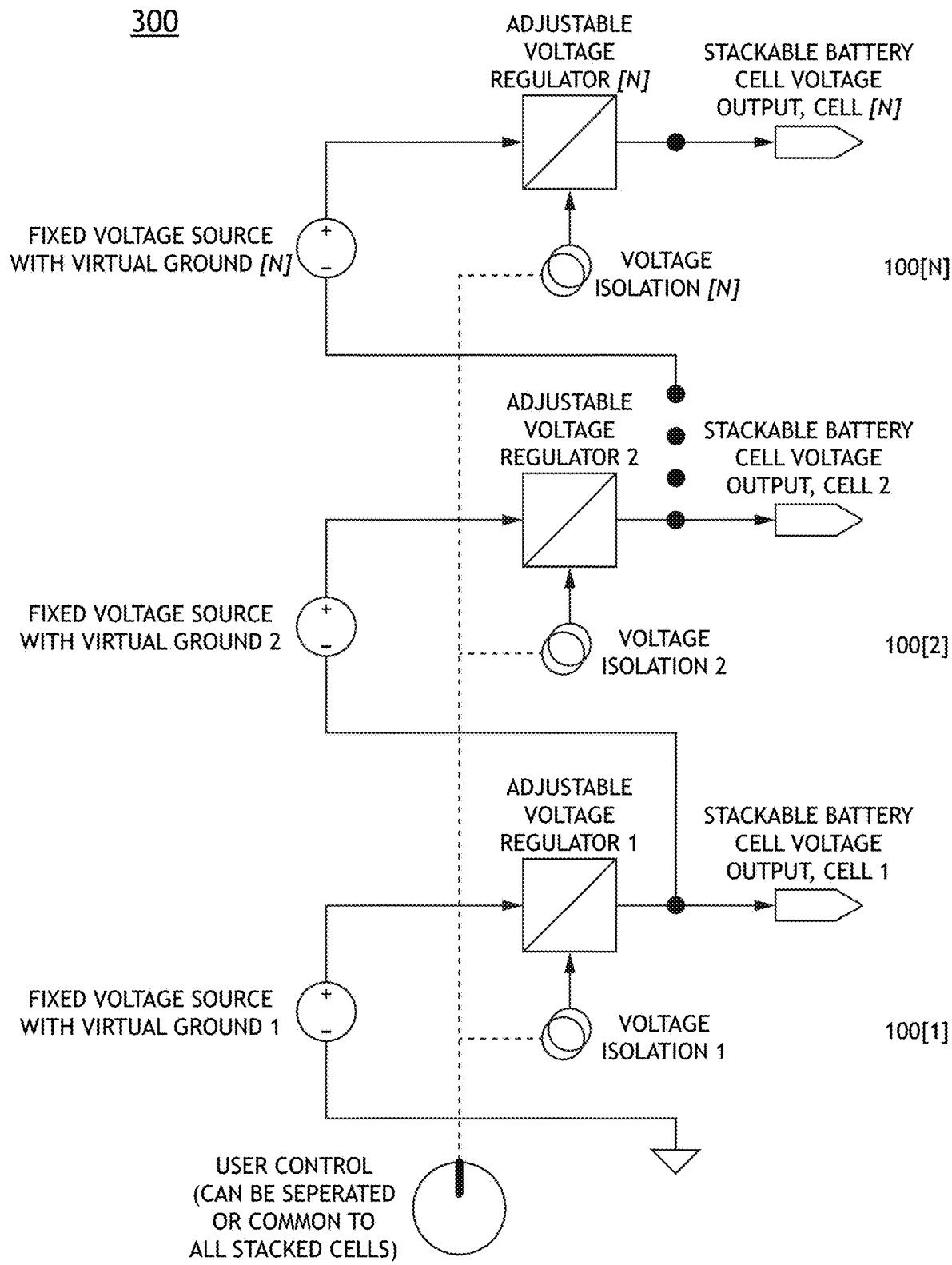
FIG. 3 is a diagram illustrating a system of battery emulators that is configured to emulate multiple battery cell voltages of a battery pack in accordance with an additional embodiment of the disclosure.

Referring to FIG. 3, a diagram illustrating a system 300 of battery emulators that is configured to emulate multiple battery cell voltages of a battery pack in accordance with an additional embodiment of the disclosure is shown. The system 300 may include any number of battery emulators 100[1]-100[N] (with N representing a number N of battery emulators and configured to replicate a battery pack with N number of cells), whereby each battery emulator may imitate or replicate a single cell of a battery. For example, the system 300 may include one battery pack emulator, three battery emulators (where N=3), ten battery emulators (where N=10), 100 battery emulators (where N=100), thus emulating a single cell battery pack, a three cell battery pack, a ten cell battery pack, or a 100 cell battery pack.

The modular aspect of the system 300 allows any number of the battery emulators to be stacked in series to emulate the desired battery pack configuration. As shown in FIG. 3, system 300 may be implemented with a single input voltage source to provide an input voltage for cell 1 and then effective input voltages may be derived for cells 2 through N as would be present in a multi-cell battery pack while maintaining isolation between the individual battery emulators 100[1]-100[N] and voltage isolation between the output voltages of each adjustable voltage regulator. Advantageously, the system 300 of battery emulators may provide a system to emulate multiple battery cell voltages (such as may be present in an actual battery pack) based on a single input, such as dial from the user control device 120. It is contemplated that system 200 may further include a battery management system which is coupled to the output of the adjustable voltage regulator and the output of the additional adjustable voltage regulator which may be employed for testing and experimentation.

The system 200, 300 of battery emulators provides several advantages over conventional devices employed to test a battery. First, system 200, 300 is not dependent upon testing actual, or real batteries thus risk of fire, explosion, and injury to a user is prevented. Also, system 200, 300 may be employed with a single input voltage source where conventional devices may require multiple power supplies in order to obtain the voltage isolation between the replicated cells of a battery. The system 200, 300 of the present disclosure provides a stacked cell emulation whereby a single cell or multiple cells may be emulated though the voltage isolation circuitry of the system 200, 300. The voltage isolation circuitry may provide galvanic isolation between each battery emulator 100, whereby each battery emulator 100*a-n* is representative of a single cell of a multi-cell battery pack that is under development and testing. The voltage isolation circuitry employing galvanic isolation may allow for virtual grounding, whereby the output voltage of each replicated cell of a battery pack may be "floated" relative to ground to avoid ground loops.

In an embodiment, system 200, 300 of battery emulators may provide an integration of isolated voltage sources, an adjustable voltage regulator for each emulated cell voltage as contrasted with the use of several separate power supplies as required for conventional develop and testing of batteries and battery packs. System 200, 300 may be operable to test a pack of cells and not individually focused on the behavior of a single cell. In such a fashion, system 200, 300 may provide a stackable battery emulator in order to test a plurality of cells, and thus may provide a battery pack simulation.

The system, 200, 300 of battery emulators may be formed of simple, off the shelf components and thus may be assembled in a low cost manner. The system 200, 300 of battery emulators may allow a faster time to market for new products that require battery management system software, such as uninterruptible power supply (UPS) backup batteries or large-scale battery energy storage systems. Additionally, system 200, 300 of battery emulators of the present disclosure does not require the purchase of a set of isolated, adjustable laboratory power supplies, or a multiple-output laboratory power supply that allows user adjustment of each channel. A set of isolated, adjustable laboratory power supplies, or a multiple-output laboratory power supply that allows user adjustment of each channel requires significant greater cost than the system 200, 300 of battery emulators of the present disclosure.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A battery emulator, comprising:
   an input voltage source, wherein the input voltage source is configured as:
      a floating voltage source, wherein no terminal of the input voltage source is coupled to either an absolute reference ground or a common ground; or comprising a virtual ground, wherein a terminal of the input voltage source is maintained at a steady reference potential without being connected directly to a reference potential;

an adjustable voltage regulator coupled to the input voltage source;

a user control device coupled to the adjustable voltage regulator and configured to control an output of the adjustable voltage regulator;

an additional adjustable voltage regulator;

an additional user control device, wherein the additional user control device is coupled to the adjustable voltage regulator and configured to control an output of the additional adjustable voltage regulator; and voltage isolation circuitry configured to provide voltage isolation between the output of the adjustable voltage regulator and the output of the additional adjustable voltage regulator, wherein the output of the adjustable voltage regulator emulates a first cell of a battery, and the output of the additional adjustable voltage regulator emulates a second cell of the battery.

2. The battery emulator as claimed in claim 1, wherein the adjustable voltage regulator is a linear regulator.

3. The battery emulator as claimed in claim 1, wherein the user control device is a manual control device configured to be operated by a user.

4. The battery emulator as claimed in claim 1, wherein the user control device is integrated into a computing device configured to execute a program of instructions which controls the output of the adjustable voltage regulator.

5. The battery emulator as claimed in claim 1, wherein the input voltage source is configured such that a terminal/node of the input voltage source is maintained at a steady reference potential without being connected to the reference potential.

6. The battery emulator as claimed in claim 1, further comprising a battery management system coupled to the output of the adjustable voltage regulator and the output of the additional adjustable voltage regulator.

7. The battery emulator as claimed in claim 1, wherein the voltage isolation circuitry is configured to provide galvanic isolation and prevent current flow between the output of the adjustable voltage regulator and the additional adjustable voltage regulator.

8. The battery emulator as claimed in claim 1, wherein the voltage isolation circuitry includes a transformer.

9. The battery emulator as claimed in claim 1, wherein the voltage isolation circuitry includes at least one of a capacitor, opto-isolator, relay, or LED-phototransistor pair.

10. A battery emulator, comprising:
an input voltage source, wherein the input voltage source is configured as:
a floating voltage source, wherein no terminal of the input voltage source is coupled to either an absolute reference ground or a common ground; or
comprising a virtual ground, wherein a terminal of the input voltage source is maintained at a steady reference potential without being connected directly to a reference potential;

an adjustable voltage regulator coupled to the input voltage source;

an additional adjustable voltage regulator;

a user control device coupled to the adjustable voltage regulator and to the additional adjustable voltage regulator, the user control device configured to control an output of the adjustable voltage regulator and control an output of the additional adjustable voltage regulator; and voltage isolation circuitry configured to provide voltage isolation between the output of the adjustable voltage regulator and the output of the additional adjustable voltage regulator, wherein the output of the adjustable voltage regulator emulates a first cell of a battery, and the output of the additional adjustable voltage regulator emulates a second cell of the battery.

11. The battery emulator as claimed in claim 10, wherein the adjustable voltage regulator is a linear regulator.

12. The battery emulator as claimed in claim 10, wherein the user control device is a manual control device configured to be operated by a user.

13. The battery emulator as claimed in claim 10, wherein the user control device is integrated into a computing device configured to execute a program of instructions which controls the output of the adjustable voltage regulator.

14. The battery emulator as claimed in claim 10, wherein the input voltage source is configured such that a terminal/node of the input voltage source is maintained at a steady reference potential without being connected to the reference potential.

15. The battery emulator as claimed in claim 10, further comprising a battery management system coupled to the output of the adjustable voltage regulator and the output of the additional adjustable voltage regulator.

16. The battery emulator as claimed in claim 10, wherein the voltage isolation circuitry is configured to provide galvanic isolation and prevent current flow between the output of the adjustable voltage regulator and the additional adjustable voltage regulator.

17. The battery emulator as claimed in claim 10, wherein the voltage isolation circuitry includes a transformer.

18. The battery emulator as claimed in claim 10, wherein the voltage isolation circuitry includes at least one of a capacitor, opto-isolator, relay, or LED-phototransistor pair.

19. The battery emulator as claimed in claim 1, wherein the input voltage source is configured as the floating voltage source.

20. The battery emulator as claimed in claim 1, wherein the input voltage source is configured as comprising the virtual ground.

* * * * *